(12) United States Patent
Wu et al.

(10) Patent No.: US 10,171,001 B2
(45) Date of Patent: Jan. 1, 2019

(54) AC-TO-DC POWER CONVERTER AND RELATED CONTROL CIRCUITS

(71) Applicant: Richtek Technology Corporation, Chupei, Hsinchu (TW)

(72) Inventors: Chang-Yu Wu, Hsinchu County (TW); Tzu-Chen Lin, Changhua County (TW)

(73) Assignee: RICHTEK TECHNOLOGY CORPORATION, Hsinchu (TW)

( * ) Notice: Subject to any disclaimer, the term of this patent is extended or adjusted under 35 U.S.C. 154(b) by 35 days.

(21) Appl. No.: 15/415,360

(22) Filed: Jan. 25, 2017

(65) Prior Publication Data

US 2017/0222566 A1   Aug. 3, 2017

Related U.S. Application Data

(60) Provisional application No. 62/290,750, filed on Feb. 3, 2016.

(30) Foreign Application Priority Data

Jul. 14, 2016   (CN) .......................... 2016 1 0555335

(51) Int. Cl.
*H02M 3/335*   (2006.01)
*H02M 1/15*   (2006.01)
(Continued)

(52) U.S. Cl.
CPC ......... *H02M 3/33569* (2013.01); *H02M 1/15* (2013.01); *H02M 3/1582* (2013.01);
(Continued)

(58) Field of Classification Search
CPC ....................................... H02M 3/335–3/3378
See application file for complete search history.

(56) References Cited

U.S. PATENT DOCUMENTS

| | | | | |
|---|---|---|---|---|
| 4,754,385 A | * | 6/1988 | McDade | H02M 3/3353 363/16 |
| 6,069,803 A | * | 5/2000 | Cross | H02M 3/33569 363/21.14 |

(Continued)

OTHER PUBLICATIONS

Chinese Office Action and Search Report for Chinese Application No. 201610555335.9, dated Aug. 30, 2018, with a partial English translation.

*Primary Examiner* — Fred E Finch, III
*Assistant Examiner* — Rafael O De Leon Domenech
(74) *Attorney, Agent, or Firm* — Birch, Stewart, Kolasch & Birch, LLP

(57) ABSTRACT

An AC-to-DC power converter includes a rectifier for generating a rectified voltage based on an AC voltage; an input capacitor coupled between the rectifier and a fixed-voltage terminal; a first inductive element; a first auxiliary capacitor; a first switch coupled between the input capacitor and the first inductive element; a second switch coupled between the first inductive element and the fixed-voltage terminal; a circuitry node; an auxiliary switch for coupling between the circuitry node and the first auxiliary capacitor or between the first auxiliary capacitor and the fixed-voltage terminal; a first diode; a second diode; a control signal generating circuit for controlling the first switch and the second switch; and an auxiliary switch control circuit for controlling the auxiliary switch.

22 Claims, 7 Drawing Sheets

(51) Int. Cl.
*H02M 3/158* (2006.01)
*H02M 7/04* (2006.01)
*H02M 3/00* (2006.01)
*H02M 1/00* (2006.01)

(52) U.S. Cl.
CPC ........... *H02M 3/3353* (2013.01); *H02M 7/04* (2013.01); *H02M 3/005* (2013.01); *H02M 2001/007* (2013.01)

(56) References Cited

U.S. PATENT DOCUMENTS

2004/0156217 A1   8/2004  Phadke
2007/0138870 A1*  6/2007  Kyono ................ H02M 3/3353
                                                         307/17

* cited by examiner

AC-TO-DC POWER CONVERTER AND RELATED CONTROL CIBRCUITS

CROSS-REFERENCE TO RELATED APPLICATIONS

This application claims the benefit of priority to Patent Application No. 201610555335.9, filed in China on Jul. 14, 2016; the entirety of which is incorporated herein by reference for all purposes.

This application claims the benefit of priority to U.S. Provisional Application Ser. No. 62/290,750, filed on Feb. 3, 2016; the entirety of which is incorporated herein by reference for all purposes.

BACKGROUND

The disclosure generally relates to an AC-to-DC power converter and, more particularly, to an AC-to-DC power converter capable of reducing the required capacitance of the input capacitor and related control circuits.

An input capacitor is required to be arranged in an AC-to-DC power converter to stabilize a rectified voltage generated by a rectifier, and the input capacitor must has a rated voltage higher than a peak value of the AC voltage received by the AC-to-DC power converter. Accordingly, if the AC-to-DC power converter has to support a wider range of the input AC voltage, it requires the input capacitor to have a larger capacitance.

For example, if the AC-to-DC power converter has to support an AC voltage ranging from 90 volts to 380 volts, the peak value of the AC voltage may up to nearly 537 volts. In this situation, an input capacitor whose rated voltage is higher than the aforementioned peak value is required by the AC-to-DC power converter in order to satisfy the design requirements. As a result, it not only significantly increases the circuit area, total weight, and hardware cost, but also increases the hardware requirement of the components inside the AC-to-DC power converter, and thereby increasing the circuitry design difficulty of the AC-to-DC power converter.

SUMMARY

An example embodiment of an AC-to-DC power converter is disclosed, comprising: a rectifier arranged to operably generate a rectified voltage based on an AC voltage; an input capacitor, wherein a first terminal of the input capacitor is coupled with an output terminal of the rectifier to receive the rectified voltage while a second terminal of the input capacitor is coupled with a fixed-voltage terminal; a first inductive element; a first auxiliary capacitor; a first switch, wherein a first terminal of the first switch is coupled with the first terminal of the input capacitor while a second terminal of the first switch is coupled with a first terminal of the first inductive element; a second switch, wherein a first terminal of the second switch is coupled with a second terminal of the first inductive element while a second terminal of the second switch is coupled with the fixed-voltage terminal; a circuitry node; an auxiliary switch for coupling between the circuitry node and the first auxiliary capacitor or between the first auxiliary capacitor and the fixed-voltage terminal; a first diode for coupling between the first terminal of the second switch and the circuitry node; a second diode for coupling between the circuitry node and the first terminal of the first switch; a control signal generating circuit for coupling with a control terminal of the first switch and a control terminal of the second switch, and arranged to operably generate a power switch control signal to control the first switch and the second switch; and an auxiliary switch control circuit, coupled with the control signal generating circuit, and arranged to operably generate an auxiliary switch control signal based on the power switch control signal to control the auxiliary switch.

A control circuit of an AC-to-DC power converter is disclosed. The AC-to-DC power converter comprises a rectifier arranged to operably generate a rectified voltage based on an AC voltage; an input capacitor, wherein a first terminal of the input capacitor is coupled with an output terminal of the rectifier to receive the rectified voltage while a second terminal of the input capacitor is coupled with a fixed-voltage terminal; a first inductive element; a first auxiliary capacitor; a first switch, wherein a first terminal of the first switch is coupled with the first terminal of the input capacitor while a second terminal of the first switch is coupled with a first terminal of the first inductive element; a second switch, wherein a first terminal of the second switch is coupled with a second terminal of the first inductive element while a second terminal of the second switch is coupled with the fixed-voltage terminal; a circuitry node; a first diode for coupling between the first terminal of the second switch and the circuitry node; a second diode for coupling between the circuitry node and the first terminal of the first switch; an auxiliary switch for coupling between the circuitry node and the first auxiliary capacitor or between the first auxiliary capacitor and the fixed-voltage terminal. The control circuit comprises: a control signal generating circuit for coupling with a control terminal of the first switch and a control terminal of the second switch, and arranged to operably generate a power switch control signal to control the first switch and the second switch; and an auxiliary switch control circuit coupled with the control signal generating circuit, and arranged to operably generate an auxiliary switch control signal based on the power switch control signal to control the auxiliary switch.

DETAILED DESCRIPTION

Reference is made in detail to embodiments of the invention, which are illustrated in the accompanying drawings. The same reference numbers may be used throughout the drawings to refer to the same or like parts, components, or operations.

Figure 1:
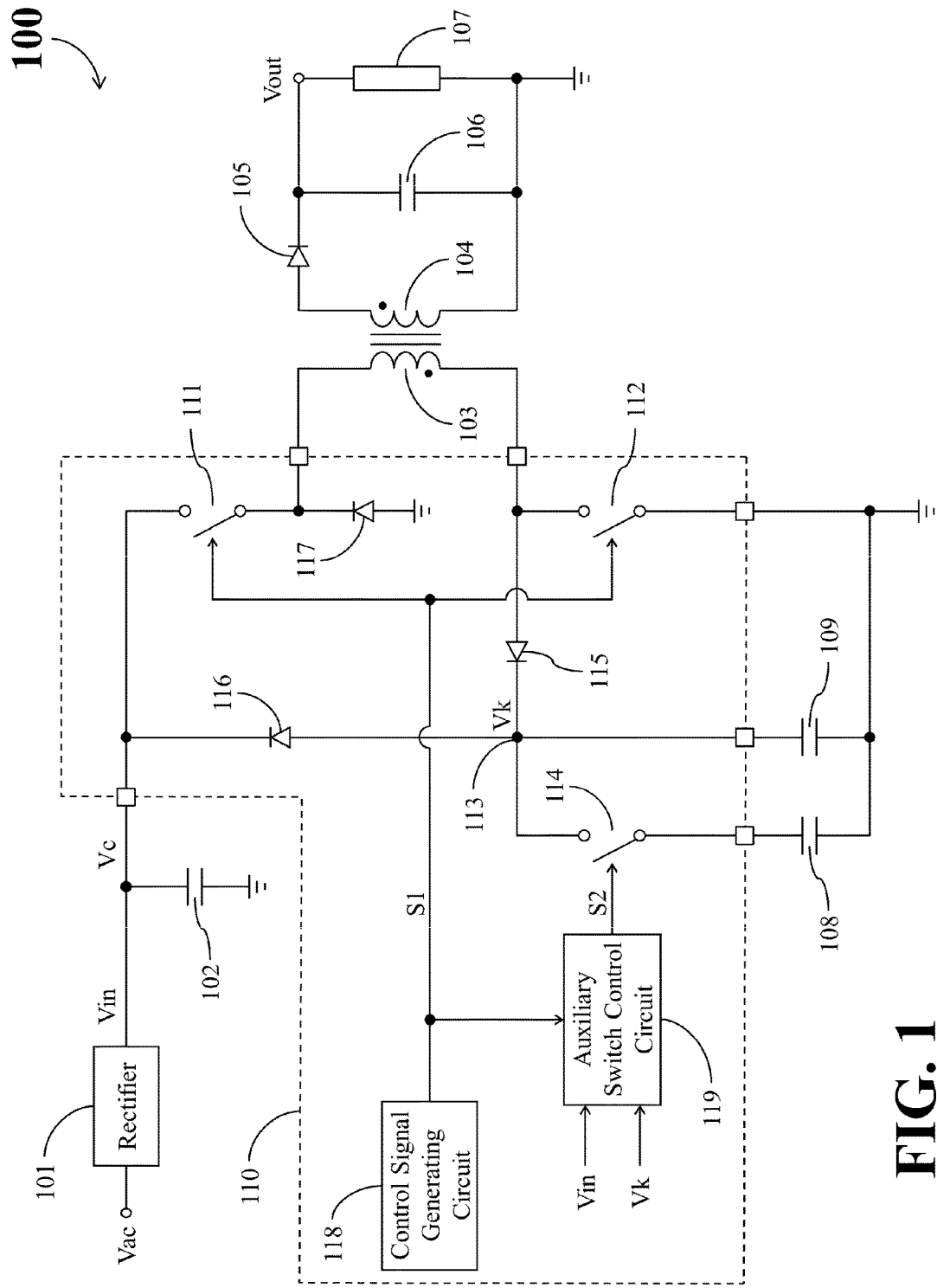
FIG. 1 shows a simplified functional block diagram of an AC-to-DC power converter according to a first embodiment of the present disclosure.

FIG. 1 shows a simplified functional block diagram of an AC-to-DC power converter 100 according to the first embodiment of the present disclosure. The AC-to-DC power converter 100 is configured to operably transform an AC voltage Vac into a DC output voltage Vout. As shown in FIG. 1, the AC-to-DC power converter 100 comprises a rectifier 101, an input capacitor 102, a first inductive element 103, a second inductive element 104, an output diode 105, an output capacitor 106, a first auxiliary capacitor 108, a second auxiliary capacitor 109, and a control circuit 110. In this embodiment, the control circuit 110 comprises a first switch 111, a second switch 112, a circuitry node 113, an auxiliary switch 114, a first diode 115, a second diode 116, a third diode 117, a control signal generating circuit 118, and an auxiliary switch control circuit 119.

In the AC-to-DC power converter 100, the rectifier 101 is arranged to operably generate a rectified voltage Vin based on the AC voltage Vac. A first terminal of the input capacitor 102 is coupled with an output terminal of the rectifier 101 to receive the rectified voltage Vin, while a second terminal of the input capacitor 102 is coupled with a fixed-voltage terminal (e.g., a ground terminal) to render a cross voltage Vc of the input capacitor 102 to be more stable than the rectified voltage Vin. The first inductive element 103 is a primary side coil, and the second inductive element 104 is a secondary side coil. The output diode 105 is coupled with a first terminal of the second inductive element 104. The output capacitor 106 is coupled between an output terminal of the output diode 105 and a second terminal of the second inductive element 104. The output capacitor 106 is arranged to operably receive the current transmitted from the output diode 105 to provide the output voltage Vout to a load 107.

As can be appreciated from the foregoing connection relationships among the components, the main structure of the AC-to-DC power converter 100 in FIG. 1 is a fly-back power converter.

In the control circuit 110, a first terminal of the first switch 111 is configured for coupling with the first terminal of the input capacitor 102, and a second terminal of the first switch 111 is configured for coupling with a first terminal of the first inductive element 103. A first terminal of the second switch 112 is configured for coupling with a second terminal of the first inductive element 103, and a second terminal of the second switch 112 is configured for coupling with the fixed-voltage terminal. A first terminal of the auxiliary switch 114 is configured for coupling with the circuitry node 113, and a second terminal of the auxiliary switch 114 is configured for coupling with the first auxiliary capacitor 108. The first diode 115 is configured for coupling between the first terminal of the second switch 112 and the circuitry node 113. The second diode 116 is configured for coupling between the circuitry node 113 and the first terminal of the first switch 111. The third diode 117 is configured for coupling between the fixed-voltage terminal and the second terminal of the first switch 111. The control signal generating circuit 118 is configured for coupling with a control terminal of the first switch 111 and a control terminal of the second switch 112. The control signal generating circuit 118 is arranged to operably generate a power switch control signal S1 to control the first switch 111 and the second switch 112.

The auxiliary switch control circuit 119 is coupled with the control signal generating circuit 118, and is arranged to operably generate an auxiliary switch control signal S2 according to the power switch control signal S1 to control the auxiliary switch 114.

In other words, the control signal generating circuit 118 may simultaneously turn on both the first switch 111 and the second switch 112 or simultaneously turn off both the first switch 111 and the second switch 112.

In the embodiment of FIG. 1, the first auxiliary capacitor 108 is coupled between the second terminal of the auxiliary switch 114 and the fixed-voltage terminal. The second auxiliary capacitor 109 is coupled between the circuitry node 113 and the fixed-voltage terminal, and is coupled with the first auxiliary capacitor 108 in a parallel connection.

The control signal generating circuit 118 of the control circuit 110 may control the switching operations of the first switch 111 and the second switch 112, so as to control the energy transformation between the first inductive element 103 and the second inductive element 104 to thereby convert the AC voltage Vac into the output voltage Vout. The auxiliary switch control circuit 119 may control the switching operation of the auxiliary switch 114 to thereby control the charging and discharging operations of the first auxiliary capacitor 108.

When the control signal generating circuit 118 turns on both the first switch 111 and the second switch 112, energy may flow to the first inductive element 103 through the first switch 111 and then be stored in the first inductive element 103. Afterward, when the control signal generating circuit 118 turns off both the first switch 111 and the second switch 112, the energy stored in the first inductive element 103 may be transmitted to the secondary side circuit through the induction of the second inductive element 104, and then the energy can be transmitted to the circuitry node 113 through the first diode 115 to charge the second auxiliary capacitor 109. In this situation, if the auxiliary switch control circuit 119 turns on the auxiliary switch 114, the energy transmitted from the first inductive element 103 to the circuitry node 113 may also charge the first auxiliary capacitor 108. Therefore, a node voltage Vk would be formed at the circuitry node 113.

Operations of the AC-to-DC power converter 100 will be further described in the following by reference to FIGS. 2-4.

Figure 2:
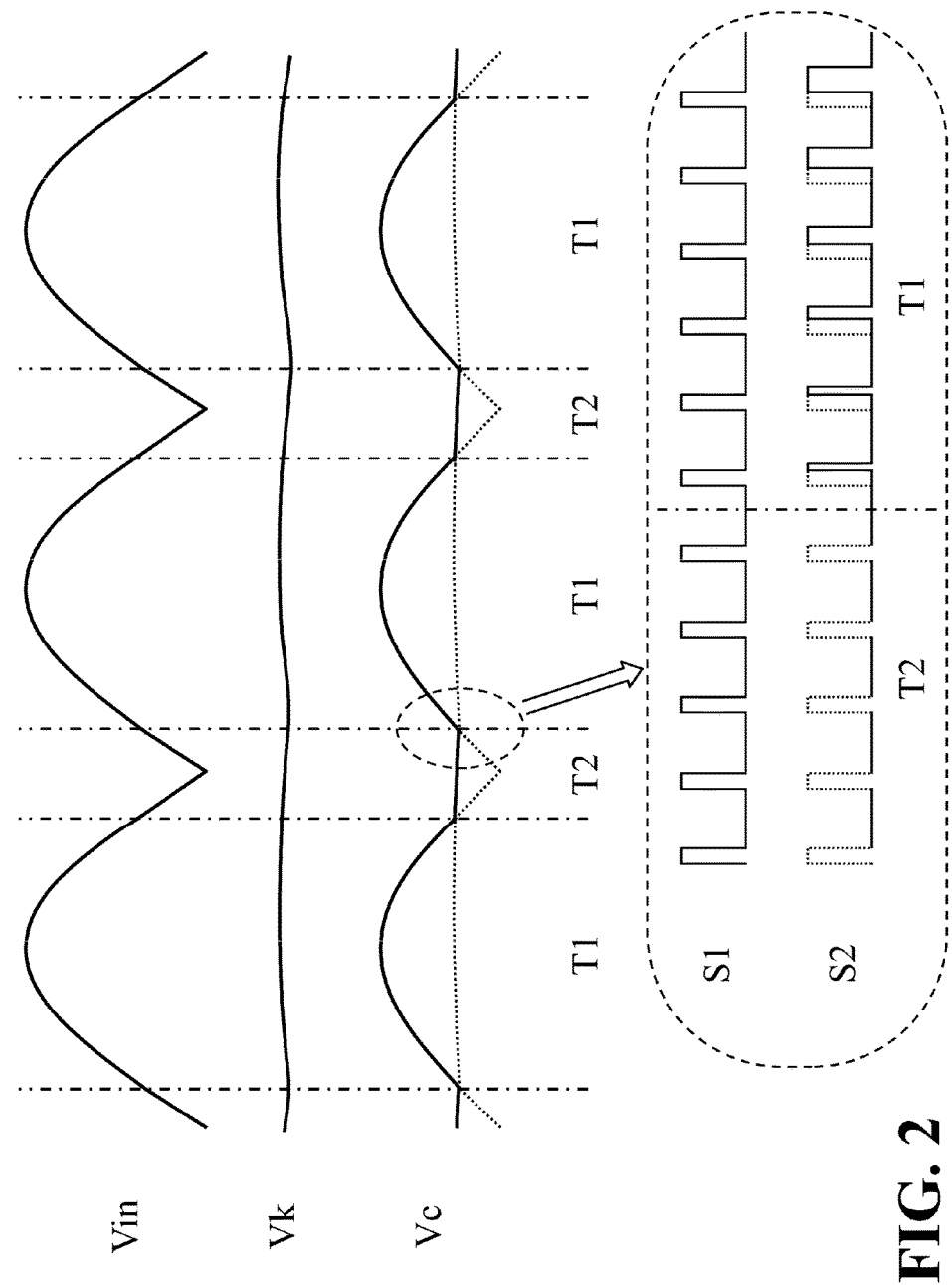
FIG. 2 shows a simplified timing diagram of the operation of the AC-to-DC power converter of FIG. 1 according to one embodiment of the present disclosure.

FIG. 2 shows a simplified timing diagram of the operations of the AC-to-DC power converter 100 according to one embodiment of the present disclosure. FIG. 3 shows a simplified schematic diagram of a current flow direction of the AC-to-DC power converter 100 when the cross voltage Vc of the input capacitor 102 is higher than the node voltage Vk according to one embodiment of the present disclosure. FIG. 4 shows a simplified schematic diagram of a current flow direction of the AC-to-DC power converter 100 when the cross voltage Vc of the input capacitor 102 is lower than the node voltage Vk according to one embodiment of the present disclosure.

As shown in FIG. 2, the rectified voltage Vin generated by the rectifier 101 is a voltage signal having an m-shaped waveform. The cross voltage Vc of the input capacitor 102 is a rather smooth voltage signal in comparison with the rectified voltage Vin, and the node voltage Vk at the circuitry node 113 is a voltage signal even more smooth than the cross voltage Vc. In addition, the node voltage Vk is higher than the valley value of the cross voltage Vc of the input capacitor 102, but lower than the peak value of the cross voltage Vc of the input capacitor 102.

Therefore the cross voltage Vc of the input capacitor 102 is sometimes higher than the node voltage Vk, and sometimes lower than the node voltage Vk.

FIG. 2 specially illustrates simplified schematic waveforms of the power switch control signal S1 and the auxiliary switch control signal S2 near the moment at which the relative magnitude relationship between the cross voltage Vc of the input capacitor 102 and the node voltage Vk changes.

In the embodiment of FIG. 2, it is assumed that both the power switch control signal S1 and the auxiliary switch control signal S2 are active high signals. That is, when the control signal generating circuit 118 configures the power switch control signal S1 to a high-voltage level, both the first switch 111 and the second switch 112 would be turned on. When the control signal generating circuit 118 configures the power switch control signal S1 to a low-voltage level, both the first switch 111 and the second switch 112 would be turned off. Similarly, when the auxiliary switch control circuit 119 configures the auxiliary switch control signal S2 to a high-voltage level, the auxiliary switch 114 would be turned on. When the auxiliary switch control circuit 119 configures the auxiliary switch control signal S2 to a low-voltage level, the auxiliary switch 114 would be turned off.

For the purpose of explanatory convenience in the following description, the time period during which the cross voltage Vc of the input capacitor 102 is higher than the node voltage Vk is hereinafter referred as a first time period T1, and the time period during which the cross voltage Vc of the input capacitor 102 is lower than the node voltage Vk is hereinafter referred as a second time period T2.

Figure 3:
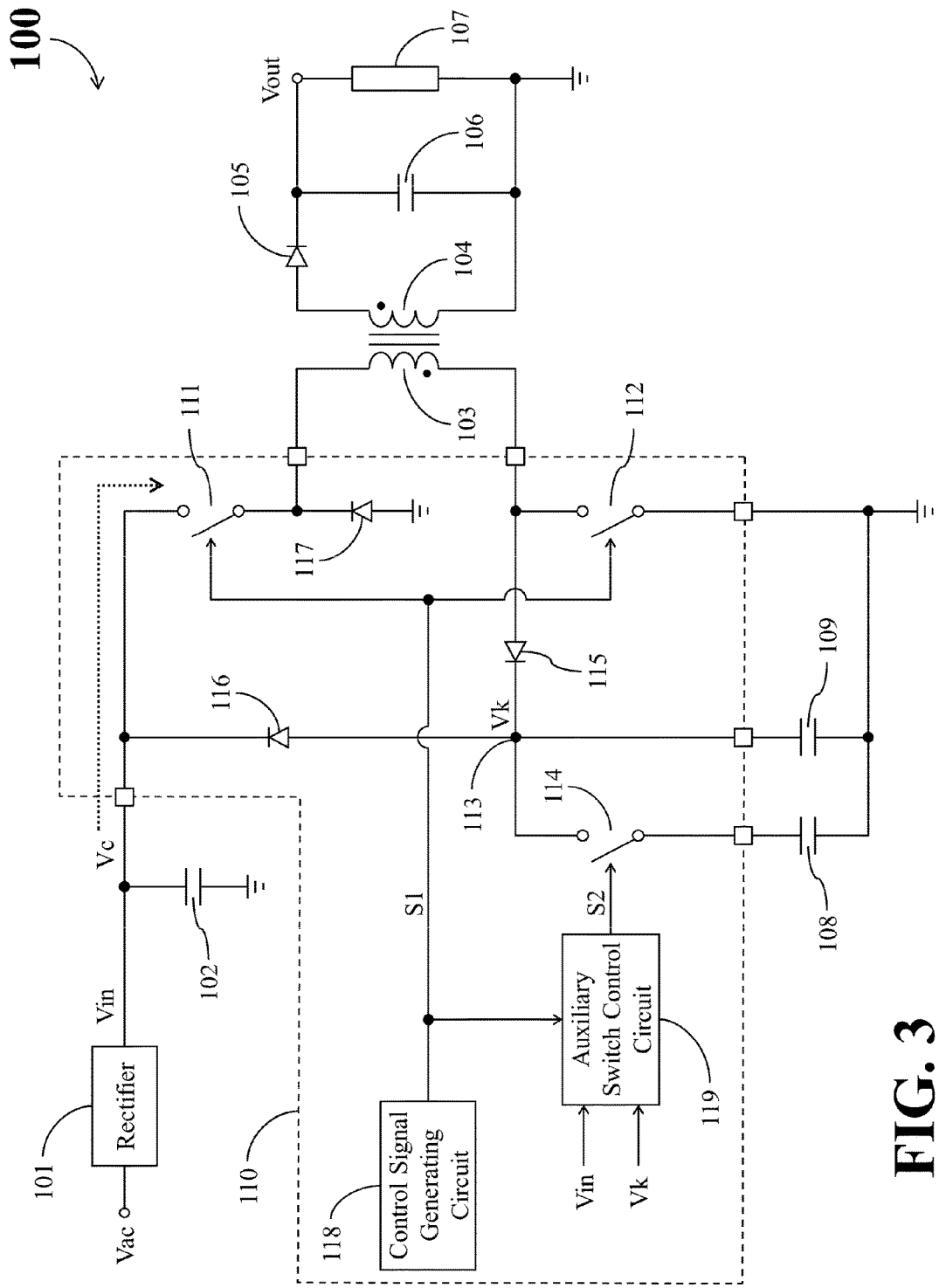
FIG. 3 shows a simplified schematic diagram of a current flow direction of the AC-to-DC power converter of FIG. 1 when a cross voltage of the input capacitor is higher than a node voltage according to one embodiment of the present disclosure.

As shown in FIG. 3, in the first time period T1 during which the cross voltage Vc of the input capacitor 102 is higher than the node voltage Vk, the current may flow from the input capacitor 102 to the first switch 111. In this situation, the energy obtained by the first inductive element 103 is supplied by the input capacitor 102.

In the first time period T1, when the control signal generating circuit 118 configures the power switch control signal S1 to maintain in the active level, both the first switch 111 and the second switch 112 are maintained in the turned-on status. In this situation, no matter the auxiliary switch control circuit 119 configures the auxiliary switch control signal S2 to the active level or to the inactive level, it does not change the energy source of the first inductive element 103, which is the input capacitor 102 in this case.

On the other hand, when the control signal generating circuit 118 configures the power switch control signal S1 to switch from the active level to the inactive level, the auxiliary switch control circuit 119 configures the auxiliary switch control signal S2 to maintain in the active level for a certain length of time and then to switch to the inactive level. Therefore, when the control signal generating circuit 118 utilizes the power switch control signal S1 to switch both the first switch 111 and the second switch 112 from the turned-on status to the turned-off status, the auxiliary switch control circuit 119 utilizes the auxiliary switch control signal S2 to maintain the auxiliary switch 114 in the turned-on status for a certain length of time and then to turn off the auxiliary switch 114. In the time period during which the auxiliary switch control circuit 119 turns on the auxiliary switch 114, the first inductive element 103 charges the first auxiliary capacitor 108 to stabilize the node voltage Vk.

In practice, in the first time period T1, the on time of the auxiliary switch 114 may be configured to be a fixed value, or may be increased gradually.

For example, when the control signal generating circuit 118 utilizes the power switch control signal S1 to switch both the first switch 111 and the second switch 112 from the turned-on status to the turned-off status, the auxiliary switch control circuit 119 may utilize the auxiliary switch control signal S2 to maintain the auxiliary switch 114 in the turned-on status for a first length of time and then to turn off the auxiliary switch 114. Afterward, in the next time the control signal generating circuit 118 utilizes the power switch control signal S1 to switch both the first switch 111 and the second switch 112 from the turned-on status to the turned-off status, the auxiliary switch control circuit 119 may utilize the auxiliary switch control signal S2 to maintain the auxiliary switch 114 in the turned-on status for a second length of time and then to turn off the auxiliary switch 114, wherein the auxiliary switch control circuit 119 may configure the second length of time to be longer than the aforementioned first length of time.

Accordingly, in the first time period T1, the auxiliary switch control circuit 119 may configure the active pulses of the auxiliary switch control signal S2 to have a constant width, or may gradually increase the active pulse width of the resulting auxiliary switch control signal S2.

By gradually increasing the on time of the auxiliary switch 114 in the first time period T1, the ripples in the output voltage Vout can be effectively reduced, and thereby further stabilizing the output voltage Vout.

Figure 4:
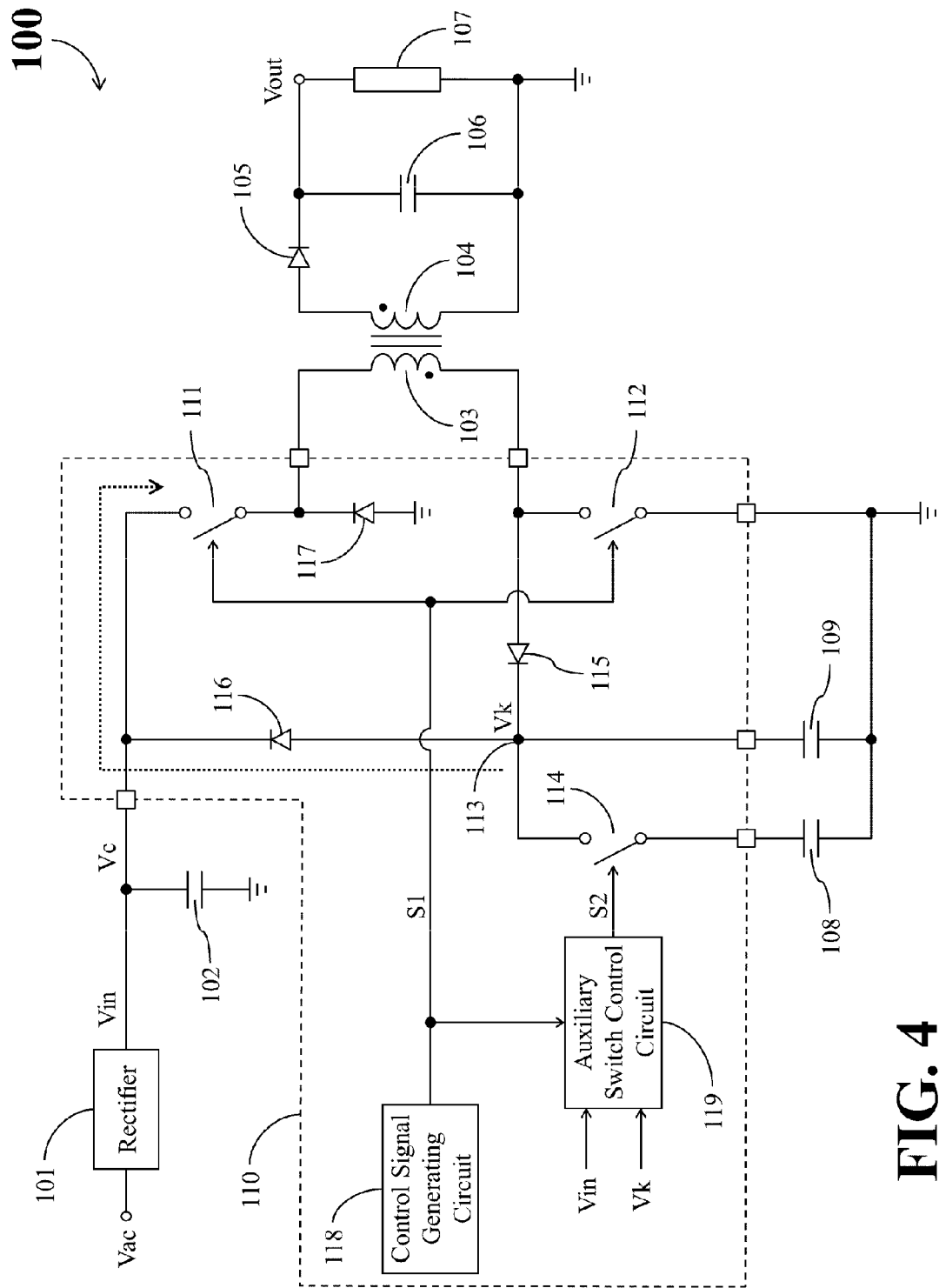
FIG. 4 shows a simplified schematic diagram of a current flow direction of the AC-to-DC power converter of FIG. 1 when the cross voltage of the input capacitor is lower than the node voltage according to one embodiment of the present disclosure.

As shown in FIG. 4, in the second time period T2 during which the cross voltage Vc of the input capacitor 102 is lower than the node voltage Vk, the current may flow from the first auxiliary capacitor 108 and/or the second auxiliary capacitor 109 to the first switch 111 through the circuitry node 113 and the second diode 116. In this situation, the energy obtained by the first inductive element 103 is supplied by the first auxiliary capacitor 108 and/or the second auxiliary capacitor 109.

In the second time period T2, while the control signal generating circuit 118 configures the power switch control signal S1 to maintain in the active level, both the first switch 111 and the second switch 112 are maintained in the turned-on status. In this situation, the auxiliary switch control circuit 119 may configure the auxiliary switch control signal S2 to the active level to turn on the auxiliary switch 114, so as to render the first auxiliary capacitor 108 and the second auxiliary capacitor 109 to cooperatively supply current to the first switch 111 through the circuitry node 113 and the second diode 116. Alternatively, the auxiliary switch control circuit 119 may configure the auxiliary switch control signal S2 to the inactive level, so as to render the second auxiliary capacitor 109 to solely supply current to the first switch 111 through the circuitry node 113 and the second diode 116. In some embodiments where the auxiliary switch 114 is realized with the transistor having the body diode, while the auxiliary switch control circuit 119 configures the auxiliary switch control signal S2 to the inactive level in the second time period T2, the first auxiliary capacitor 108 and the second auxiliary capacitor 109 are enabled to cooperatively supply the current to the first switch 111 through the circuitry node 113 and the second diode 116.

On the other hand, in the situation that the control signal generating circuit 118 configures the power switch control signal S1 to the inactive level, the auxiliary switch control circuit 119 would configure the auxiliary switch control signal S2 to the inactive level. Therefore, when the control signal generating circuit 118 utilizes the power switch control signal S1 to turn off the first switch 111 and the second switch 112, the auxiliary switch control circuit 119 also utilizes the auxiliary switch control signal S2 to turn off the auxiliary switch 114.

Accordingly, in the second time period T2, the auxiliary switch control circuit 119 may configure the auxiliary switch control signal S2 to synchronously follow the power switch control signal S1, or may configure the auxiliary switch control signal S2 to maintain in the inactive level.

In practice, each of the first switch 111, the second switch 112, and the auxiliary switch 114 may be realized with various appropriate transistor components. The control signal generating circuit 118 may be realized with various appropriate structures of existing PWM signal generating circuits or PFM signal generating circuits. The auxiliary switch control circuit 119 may be realized with a cooperation of various comparators and appropriate analog or digital pulse generating circuits.

It can be appreciated from the foregoing descriptions that in the period during which the cross voltage Vc of the input capacitor 102 is lower than the node voltage Vk, the first auxiliary capacitor 108 and/or the second auxiliary capacitor 109 may supply current to the first inductive element 103 through the circuitry node 113 and the second diode 116, and thus the input capacitor 102 needs not to supply current to the first inductive element 103 during this period. As a result, the voltage drop of the cross voltage Vc of the input capacitor 102 can be effectively reduced due to the presence of the first auxiliary capacitor 108 and/or the second auxiliary capacitor 109 and the operations of the auxiliary switch control circuit 119 and the auxiliary switch 114.

In other words, the structure of the aforementioned AC-to-DC power converter 100 can effectively reduce the variation of the cross voltage Vc of the input capacitor 102, thereby reducing the requirement level of the capacitance of the input capacitor 102. As a result, the AC-to-DC power converter 100 is enabled to support a wider AC voltage range by adopting an input capacitor 102 having a smaller capacitance.

Additionally, since the variation of the cross voltage Vc of the input capacitor 102 is reduced, the stability of the output voltage Vout generated by the AC-to-DC power converter 100 can be effectively improved.

Figure 5:
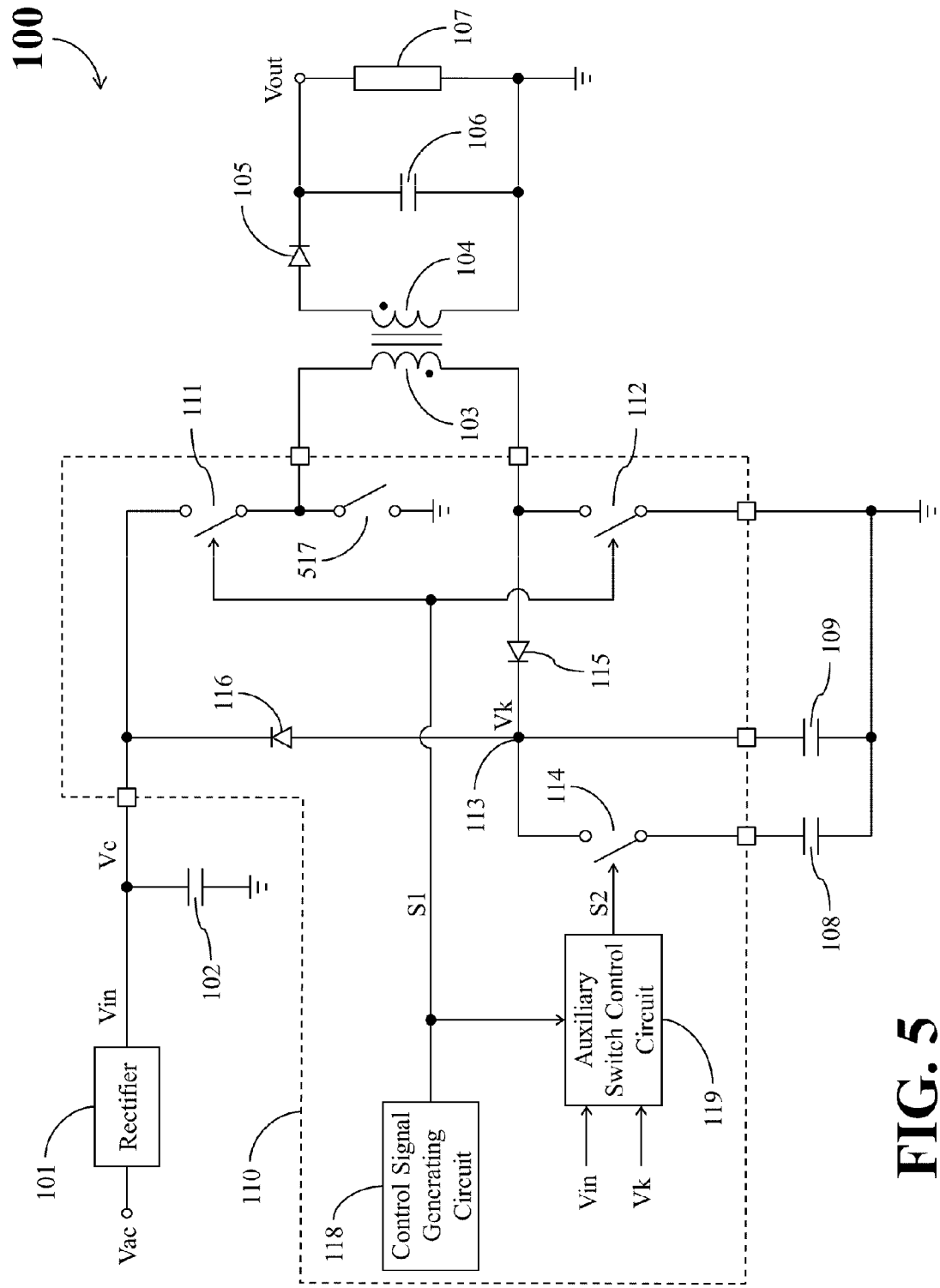
FIG. 5 shows a simplified functional block diagram of an AC-to-DC power converter according to a second embodiment of the present disclosure.

FIG. 5 shows a simplified functional block diagram of the AC-to-DC power converter 100 according to a second embodiment of the present disclosure.

The embodiment of FIG. 5 is similar with the aforementioned embodiment of FIG. 1, but the aforementioned third diode 117 in FIG. 1 is replaced by a third switch 517 in the embodiment of FIG. 5.

As shown in FIG. 5, a first terminal of the third switch 517 is coupled with the second terminal of the first switch 111, and a second terminal of the third switch 517 is coupled with the fixed-voltage terminal. In the embodiment of FIG. 5, the control signal generating circuit 118 is further coupled with a control terminal of the third switch 517. The control signal generating circuit 118 turns off the third switch 517 while turns on the first switch 111 and the second switch 112, and the control signal generating circuit 118 turns on the third switch 517 while turns off the first switch 111 and the second switch 112.

In practice, the third switch 517 may be realized with various appropriate transistor components. The foregoing descriptions regarding the connections, operations, implementations, and related advantages of other corresponding components in the embodiment of FIG. 1 are also applicable to the embodiment of FIG. 5. For the sake of brevity, those descriptions will not be repeated here.

It can be appreciated from the foregoing descriptions that the structure of the aforementioned control circuit 110 is applicable to the synchronous-type AC-to-DC power converter 100, and also applicable to the asynchronous-type AC-to-DC power converter 100.

Additionally, the different functional blocks in the aforementioned AC-to-DC power converter 100 may be realized with separate circuits, or may be integrated into a single circuit chip. For example, all of the functional blocks of the control circuit 110 may be integrated into a single controller IC, and at least one of the first switch 111, the second switch 112, the auxiliary switch 114, the first diode 115, the second diode 116, and the third diode 117 (or the third switch 517) may be instead configured on an external circuit board coupled with the control circuit 110.

Figure 6:
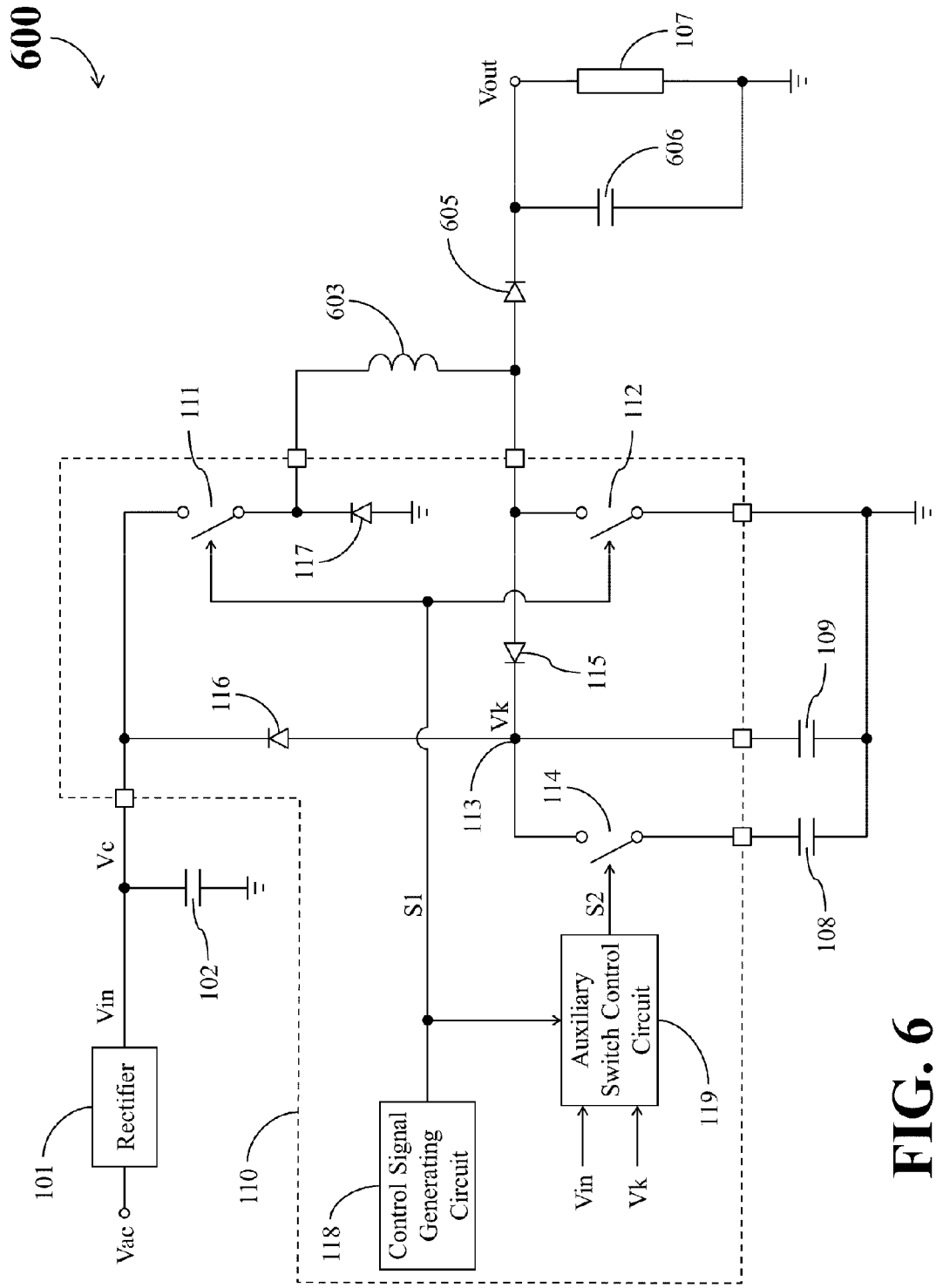
FIG. 6 shows a simplified functional block diagram of an AC-to-DC power converter according to a third embodiment of the present disclosure.

FIG. 6 shows a simplified functional block diagram of an AC-to-DC power converter 600 according to a third embodiment of the present disclosure.

The AC-to-DC power converter 600 is configured to operably transform the AC voltage Vac into the DC output voltage Vout. As shown in FIG. 6, the AC-to-DC power converter 600 comprises the aforementioned rectifier 101, input capacitor 102, first auxiliary capacitor 108, second auxiliary capacitor 109, and control circuit 110. In addition, the AC-to-DC power converter 600 further comprises a first inductive element 603, an output diode 605, and an output capacitor 606.

In the AC-to-DC power converter 600, the second terminal of the first switch 111 is configured for coupling with a first terminal of the first inductive element 603. The first terminal of the second switch 112 is configured for coupling with a second terminal of the first inductive element 603. The output diode 605 is coupled with the second terminal of the first inductive element 603. The output capacitor 606 is coupled between an output terminal of the output diode 605 and the fixed-voltage terminal, and is configured to operably receive the voltage transmitted from the output diode 605 to provide the output voltage Vout to the load 107.

As can be appreciated from the connection relationships among the aforementioned components, the main structure of the AC-to-DC power converter 600 in FIG. 6 is a buck-boost power converter.

The foregoing descriptions regarding the connections, operations, implementations, and related advantages of other corresponding components in the embodiment of FIG. 1 are also applicable to the embodiment of FIG. 6. For the sake of brevity, those descriptions will not be repeated here.

Similar with the aforementioned embodiment of FIG. 5, the third diode 117 in FIG. 6 can be replaced by the third switch 517. In other words, the structure of the control circuit 110 is applicable to the synchronous-type AC-to-DC power converter 600, and also applicable to the asynchronous-type AC-to-DC power converter 600.

Figure 7:
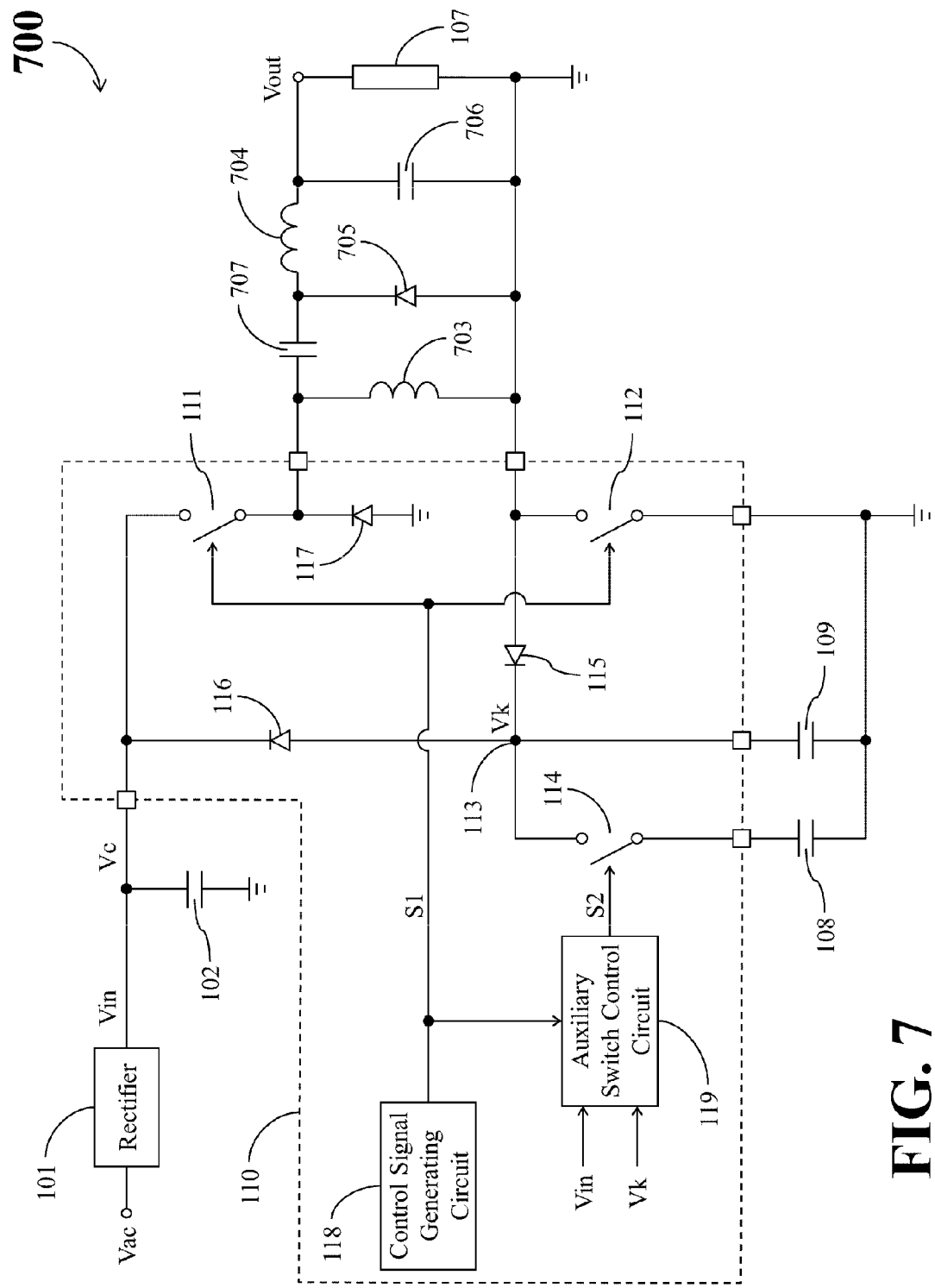
FIG. 7 shows a simplified functional block diagram of an AC-to-DC power converter according to a fourth embodiment of the present disclosure.

FIG. 7 shows a simplified functional block diagram of an AC-to-DC power converter 700 according to a fourth embodiment of the present disclosure.

The AC-to-DC power converter 700 is configured to operably transform the AC voltage Vac into the DC output voltage Vout. As shown in FIG. 7, the AC-to-DC power converter 700 comprises the aforementioned rectifier 101, input capacitor 102, first auxiliary capacitor 108, second auxiliary capacitor 109, and control circuit 110. In addition, the AC-to-DC power converter 700 further comprises a first inductive element 703, a second inductive element 704, an output diode 705, an output capacitor 706, and a coupling capacitor 707.

In the AC-to-DC power converter 700, the second terminal of the first switch 111 is configured for coupling with a first terminal of the first inductive element 703. The first terminal of the second switch 112 is configured for coupling with a second terminal of the first inductive element 703. The output diode 705 is coupled between the second terminal of the first inductive element 703 and a first terminal of the second inductive element 704. The output capacitor 706 is coupled between a second terminal of the second inductive element 704 and the second terminal of the first inductive element 703, and is configured to operably receive the current transmitted from the second inductive element 704 to provide the output voltage Vout. The coupling capacitor 707 is coupled between the first terminal of the first inductive element 703 and the first terminal of the second inductive element 704.

As can be appreciated from the connection relationships among the aforementioned components, the main structure of the AC-to-DC power converter 700 in FIG. 7 is a Zeta power converter.

The foregoing descriptions regarding the connections, operations, implementations, and related advantages of the other corresponding components in the aforementioned embodiment of FIG. 1 are also applicable to the embodiment of FIG. 7. For the sake of brevity, those descriptions will not be repeated here.

Similar with the aforementioned embodiment of FIG. 5, the third diode 117 in FIG. 7 may be replaced by the third switch 517. In other words, the structure of the control circuit 110 is applicable to the synchronous-type AC-to-DC power converter 700, and also applicable to the asynchronous AC-to-DC power converter 700.

In the descriptions of the foregoing embodiments, the first auxiliary capacitor 108 is coupled between the second terminal of the auxiliary switch 114 and the fixed-voltage terminal. But this is merely an exemplary embodiment, rather than a restriction to the practical implementations. In other embodiments, for example, the positions of the first auxiliary capacitor 108 and the auxiliary switch 114 may be swapped. That is, the first terminal of the first auxiliary capacitor 108 may be coupled with the circuitry node 113, the first terminal of the auxiliary switch 114 may be instead coupled with the second terminal of the first auxiliary capacitor 108, and the second terminal of the auxiliary switch 114 may be instead coupled with the fixed-voltage terminal. In other words, the auxiliary switch 114 may be coupled between the circuitry node 113 and the first auxiliary capacitor 108, or may be coupled between the first auxiliary capacitor 108 and the fixed-voltage terminal.

Additionally, in the foregoing descriptions of FIG. 2, it is assumed that both the power switch control signal S1 and the auxiliary switch control signal S2 are active high signals. But this is merely for the purpose of explanatory convenience, rather than a restriction to the practical implementations. In practice, at least one of the power switch control signal S1 and the auxiliary switch control signal S2 may be instead configured to be an active low signal. In this situation, the implementations of the first switch 111, the second switch 112, and/or the auxiliary switch 114 may be adaptively modified.

In some embodiments, the second auxiliary capacitor 109 may be omitted to reduce the required circuit area.

Certain terms are used throughout the description and the claims to refer to particular components. One skilled in the art appreciates that a component may be referred to as different names. This disclosure does not intend to distinguish between components that differ in name but not in function. In the description and in the claims, the term "comprise" is used in an open-ended fashion, and thus should be interpreted to mean "include, but not limited to." The term "couple" is intended to compass any indirect or direct connection. Accordingly, if this disclosure mentioned that a first device is coupled with a second device, it means that the first device may be directly or indirectly connected to the second device through electrical connections, wireless communications, optical communications, or other signal connections with/without other intermediate devices or connection means.

The term "and/or" may comprise any and all combinations of one or more of the associated listed items. In addition, the singular forms "a," "an," and "the" herein are intended to comprise the plural forms as well, unless the context clearly indicates otherwise.

The term "voltage signal" used throughout the description and the claims may be expressed in the format of a current in implementations, and the term "current signal" used throughout the description and the claims may be expressed in the format of a voltage in implementations.

Other embodiments of the invention will be apparent to those skilled in the art from consideration of the specification and practice of the invention disclosed herein. It is intended that the specification and examples be considered as exemplary only, with a true scope and spirit of the invention indicated by the following claims.

What is claimed is:

1. An AC-to-DC power converter (100; 600; 700), comprising:
    a rectifier (101) arranged to operably generate a rectified voltage (Vin) based on an AC voltage (Vac);
    an input capacitor (102), wherein a first terminal of the input capacitor (102) is coupled with an output terminal of the rectifier (101) to receive the rectified voltage (Vin) while a second terminal of the input capacitor (102) is coupled with a fixed-voltage terminal;
    a first inductive element (103; 603; 703);
    a first auxiliary capacitor (108);
    a first switch (111), wherein a first terminal of the first switch (111) is coupled with the first terminal of the input capacitor (102) while a second terminal of the first switch (111) is coupled with a first terminal of the first inductive element (103; 603; 703);
    a second switch (112), wherein a first terminal of the second switch (112) is coupled with a second terminal of the first inductive element (103; 603; 703) while a second terminal of the second switch (112) is coupled with the fixed-voltage terminal;
    a circuitry node (113);
    an auxiliary switch (114) for coupling between the circuitry node (113) and the first auxiliary capacitor (108) or between the first auxiliary capacitor (108) and the fixed-voltage terminal;
    a first diode (115) for coupling between the first terminal of the second switch (112) and the circuitry node (113);
    a second diode (116) for coupling between the circuitry node (113) and the first terminal of the first switch (111);
    a control signal generating circuit (118) for coupling with a control terminal of the first switch (111) and a control terminal of the second switch (112), and arranged to operably generate a power switch control signal (S1) to control the first switch (111) and the second switch (112); and
    an auxiliary switch control circuit (119), coupled with the control signal generating circuit (118), and arranged to operably generate an auxiliary switch control signal (S2) based on the power switch control signal (S1) to control the auxiliary switch (114);

wherein during a first time period (T1) that a cross voltage (Vc) of the input capacitor (102) is higher than a node voltage (Vk) at the circuitry node (113), when the control signal generating circuit (118) utilizes the power switch control signal (S1) to switch each of the first switch (111) and the second switch (112) from a turned-on status to a turned-off status, the auxiliary switch control circuit (119) first utilizes the auxiliary switch control signal (S2) to maintain the auxiliary switch (114) in a turned-on status for a first length of time and then turns off the auxiliary switch (114).

2. The AC-to-DC power converter (100; 600; 700) of claim 1, wherein in next time the control signal generating circuit (118) utilizes the power switch control signal (S1) to switch each of the first switch (111) and the second switch (112) from the turned-on status to the turned-off status, the auxiliary switch control circuit (119) first utilizes the auxiliary switch control signal (S2) to maintain the auxiliary switch (114) in the turned-on status for a second length of time and then turns off the auxiliary switch (114), wherein the second length of time is longer than the first length of time.

3. The AC-to-DC power converter (100; 600; 700) of claim 1, wherein during a second time period (T2) that a cross voltage (Vc) of the input capacitor (102) is lower than a node voltage (Vk) at the circuitry node (113), when the control signal generating circuit (118) utilizes the power switch control signal (S1) to turn off each of the first switch (111) and the second switch (112), the auxiliary switch control circuit (119) also utilizes the auxiliary switch control signal (S2) to turn off the auxiliary switch (114).

4. The AC-to-DC power converter (100; 600; 700) of claim 1, further comprising:
a second auxiliary capacitor (109) coupled between the circuitry node (113) and the fixed-voltage terminal, and coupled with the first auxiliary capacitor (108) in a parallel connection.

5. The AC-to-DC power converter (100; 600; 700) of claim 1, further comprising:
a third diode (117) for coupling between the fixed-voltage terminal and the second terminal of the first switch (111).

6. The AC-to-DC power converter (100; 600; 700) of claim 1, further comprising:
a third switch (517) for coupling between the fixed-voltage terminal and the second terminal of the first switch (111);
wherein the control signal generating circuit (118) is further configured for coupling with a control terminal of the third switch (517), the control signal generating circuit (118) is arranged to operably turn off the third switch (517) while turn on the first switch (111) and the second switch (112), and to operably turn on the third switch (517) while turn off the first switch (111) and the second switch (112).

7. The AC-to-DC power converter (100; 600; 700) of claim 1, further comprising:
a second inductive element (104);
an output diode (105) coupled with a first terminal of the second inductive element (104); and
an output capacitor (106) coupled between an output terminal of the output diode (105) and a second terminal of the second inductive element (104), and arranged to operably receive currents transmitted from the output diode (105) to provide an output voltage (Vout);
wherein the first inductive element (103; 603; 703) is a primary side coil, and the second inductive element (104) is a secondary side coil.

8. The AC-to-DC power converter (100; 600; 700) of claim 1, further comprising:
an output diode (605) coupled with the second terminal of the first inductive element (103; 603; 703); and
an output capacitor (606) coupled between an output terminal of the output diode (605) and the fixed-voltage terminal, and arranged to operably receive currents transmitted from the output diode (605) to provide an output voltage (Vout).

9. The AC-to-DC power converter (100; 600; 700) of claim 1, further comprising:
a second inductive element (704);
an output diode (705) coupled between the second terminal of the first inductive element (103; 603; 703) and a first terminal of the second inductive element (704);
an output capacitor (706) coupled between a second terminal of the second inductive element (704) and the second terminal of the first inductive element (103; 603; 703), and arranged to operably receive currents transmitted from the second inductive element (704) to provide an output voltage (Vout); and
a coupling capacitor (707) coupled between the first terminal of the first inductive element (103; 603; 703) and the first terminal of the second inductive element (704).

10. A control circuit (110) of an AC-to-DC power converter (100; 600; 700), wherein the AC-to-DC power converter (100; 600; 700) comprises a rectifier (101) arranged to operably generate a rectified voltage (Vin) based on an AC voltage (Vac); an input capacitor (102), wherein a first terminal of the input capacitor (102) is coupled with an output terminal of the rectifier (101) to receive the rectified voltage (Vin) while a second terminal of the input capacitor (102) is coupled with a fixed-voltage terminal; a first inductive element (103; 603; 703); a first auxiliary capacitor (108); a first switch (111), wherein a first terminal of the first switch (111) is coupled with the first terminal of the input capacitor (102) while a second terminal of the first switch (111) is coupled with a first terminal of the first inductive element (103; 603; 703); a second switch (112), wherein a first terminal of the second switch (112) is coupled with a second terminal of the first inductive element (103; 603; 703) while a second terminal of the second switch (112) is coupled with the fixed-voltage terminal; a circuitry node (113); a first diode (115) for coupling between the first terminal of the second switch (112) and the circuitry node (113); a second diode (116) for coupling between the circuitry node (113) and the first terminal of the first switch (111); an auxiliary switch (114) for coupling between the circuitry node (113) and the first auxiliary capacitor (108) or between the first auxiliary capacitor (108) and the fixed-voltage terminal; the control circuit (110) comprising:
a control signal generating circuit (118) for coupling with a control terminal of the first switch (111) and a control terminal of the second switch (112), and arranged to operably generate a power switch control signal (S1) to control the first switch (11) and the second switch (112); and
an auxiliary switch control circuit (119) coupled with the control signal generating circuit (118), and arranged to operably generate an auxiliary switch control signal (S2) based on the power switch control signal (S1) to control the auxiliary switch (114);

wherein during a first time period (T1) that a cross voltage (Vc) of the input capacitor (102) is higher than a node voltage (Vk) at the circuitry node (113), when the control signal generating circuit (118) utilizes the power switch control signal (S1) to switch each of the first switch (111) and the second switch (112) from a turned-on status to a turned-off status, the auxiliary switch control circuit (119) first utilizes the auxiliary switch control signal (S2) to maintain the auxiliary switch (114) in a turned-on status for a first length of time and then turns off the auxiliary switch (114).

11. The control circuit (110) of claim 10, wherein in next time the control signal generating circuit (118) utilizes the power switch control signal (S1) to switch each of the first switch (111) and the second switch (112) from the turned-on status to the turned-off status, the auxiliary switch control circuit (119) first utilizes the auxiliary switch control signal (S2) to maintain the auxiliary switch (114) in the turned-on status for a second length of time and then turns off the auxiliary switch (114), wherein the second length of time is longer than the first length of time.

12. The control circuit (110) of claim 10, wherein during a second time period (T2) that a cross voltage (Vc) of the input capacitor (102) is lower than a node voltage (Vk) at the circuitry node (113), when the control signal generating circuit (118) utilizes the power switch control signal (S1) to turn off each of the first switch (111) and the second switch (112), the auxiliary switch control circuit (119) also utilizes the auxiliary switch control signal (S2) to turn off the auxiliary switch (114).

13. The control circuit (110) of claim 10, wherein the AC-to-DC power converter (100; 600; 700) further comprises:
a second auxiliary capacitor (109) coupled between the circuitry node (113) and the fixed-voltage terminal, and coupled with the first auxiliary capacitor (108) in a parallel connection.

14. The control circuit (110) of claim 10, wherein the AC-to-DC power converter (100; 600; 700) further comprises:
a third diode (117) for coupling between the fixed-voltage terminal and the second terminal of the first switch (111).

15. The control circuit (110) of claim 14, wherein the control circuit (110) comprises the third diode (117).

16. The control circuit (110) of claim 10, wherein the AC-to-DC power converter (100; 600; 700) further comprises:
a third switch (517) for coupling between the fixed-voltage terminal and the second terminal of the first switch (111);
wherein the control signal generating circuit (118) is further configured for coupling with a control terminal of the third switch (517), the control signal generating circuit (118) is arranged to operably turn off the third switch (517) while turn on the first switch (111) and the second switch (112), and to operably turn on the third switch (517) while turn off the first switch (111) and the second switch (112).

17. The control circuit (110) of claim 16, wherein the control circuit (110) comprises the third switch (517).

18. The control circuit (110) of claim 10, wherein the control circuit (110) comprises at least one of the first switch (111), the second switch (112), the circuitry node (113), the auxiliary switch (114), the first diode (115), and the second diode (116).

19. The control circuit (110) of claim 10, wherein the AC-to-DC power converter (100; 600; 700) further comprises:
a second inductive element (104);
an output diode (105) coupled with a first terminal of the second inductive element (104); and
an output capacitor (106) coupled between an output terminal of the output diode (105) and a second terminal of the second inductive element (104), and arranged to operably receive currents transmitted from the output diode (105) to provide an output voltage (Vout).

20. The control circuit (110) of claim 10, wherein the AC-to-DC power converter (100; 600; 700) further comprises:
an output diode (605) coupled with the second terminal of the first inductive element (103; 603; 703); and
an output capacitor (606) coupled between an output terminal of the output diode (605) and the fixed-voltage terminal, and arranged to operably receive currents transmitted from the output diode (605) to provide an output voltage (Vout).

21. The control circuit (110) of claim 10, wherein the AC-to-DC power converter (100; 600; 700) further comprises:
a second inductive element (704);
an output diode (705) coupled between the second terminal of the first inductive element (103; 603; 703) and a first terminal of the second inductive element (704);
an output capacitor (706) coupled between a second terminal of the second inductive element (704) and the second terminal of the first inductive element (103; 603; 703), and arranged to operably receive currents transmitted from the second inductive element (704) to provide an output voltage (Vout); and
a coupling capacitor (707) coupled between the first terminal of the first inductive element (103; 603; 703) and the first terminal of the second inductive element (704).

22. A control circuit (110) of an AC-to-DC power converter (100; 600; 700), wherein the AC-to-DC power converter (100; 600; 700) comprises a rectifier (101) arranged to operably generate a rectified voltage (Vin) based on an AC voltage (Vac); an input capacitor (102), wherein a first terminal of the input capacitor (102) is coupled with an output terminal of the rectifier (101) to receive the rectified voltage (Vin) while a second terminal of the input capacitor (102) is coupled with a fixed-voltage terminal; a first inductive element (103; 603; 703); a first auxiliary capacitor (108); a first switch (111), wherein a first terminal of the first switch (111) is coupled with the first terminal of the input capacitor (102) while a second terminal of the first switch (111) is coupled with a first terminal of the first inductive element (103; 603; 703); a second switch (112), wherein a first terminal of the second switch (112) is coupled with a second terminal of the first inductive element (103; 603; 703) while a second terminal of the second switch (112) is coupled with the fixed-voltage terminal; a circuitry node (113); a first diode (115) for coupling between the first terminal of the second switch (112) and the circuitry node (113); a second diode (116) for coupling between the circuitry node (113) and the first terminal of the first switch (111); an auxiliary switch (114) for coupling between the circuitry node (113) and the first auxiliary capacitor (108) or between the first auxiliary capacitor (108) and the fixed-voltage terminal; the control circuit (110) comprising:

a control signal generating circuit (118) for coupling with a control terminal of the first switch (111) and a control terminal of the second switch (112), and arranged to operably generate a power switch control signal (S1) to control the first switch (11) and the second switch (112); and an auxiliary switch control circuit (119) coupled with the control signal generating circuit (118), and arranged to operably generate an auxiliary switch control signal (S2) based on the power switch control signal (S1) to control the auxiliary switch (114);

wherein during a second time period (T2) that a cross voltage (Vc) of the input capacitor (102) is lower than a node voltage (Vk) at the circuitry node (113), when the control signal generating circuit (118) utilizes the power switch control signal (S1) to turn off each of the first switch (111) and the second switch (112), the auxiliary switch control circuit (119) also utilizes the auxiliary switch control signal (S2) to turn off the auxiliary switch (114).

\* \* \* \* \*